United States Patent [19]

Lundin

[11] 4,047,467
[45] Sept. 13, 1977

[54] DEVICE FOR GENERATING OIL PRESSURE FOR AN ARTILLERY PIECE OR A CORRESPONDING UNIT

[75] Inventor: Lars Olof Lundin, Karlskoga, Sweden

[73] Assignee: AB Bofors, Bofors, Sweden

[21] Appl. No.: 638,223

[22] Filed: Dec. 5, 1975

[30] Foreign Application Priority Data

Dec. 18, 1974 Sweden .............................. 7415879

[51] Int. Cl.² ............................................. F41G 5/04
[52] U.S. Cl. ................................. 89/41 H; 180/6.48
[58] Field of Search ........................... 89/41 H, 40 C; 180/6.48, 53 R

[56] References Cited

U.S. PATENT DOCUMENTS

| 1,354,182 | 9/1920 | Giangiopo | 89/40 C |
| 1,573,354 | 2/1926 | Methlin | 89/41 H |
| 3,672,161 | 6/1972 | Krusche et al. | 180/6.48 X |
| 3,807,174 | 4/1974 | Wagenseil et al. | 180/6.48 X |
| 3,896,700 | 7/1975 | Johnsson et al. | 89/40 C |
| 3,916,767 | 11/1975 | Barton | 180/6.48 X |

*Primary Examiner*—David H. Brown
*Attorney, Agent, or Firm*—Pollock, Vande Sande & Priddy

[57] ABSTRACT

A hydraulic control and driving apparatus for a self-propelled artillery piece includes hydrostatic transmissions for the driving wheels which are driven by hydraulic motors and variable displacement hydraulic pumps. The apparatus includes means for training, elevating and firing the artillery piece by diverting hydraulic fluid from one main pump to the appropriate control elements.

7 Claims, 2 Drawing Figures

DEVICE FOR GENERATING OIL PRESSURE FOR AN ARTILLERY PIECE OR A CORRESPONDING UNIT

BACKGROUND OF THE INVENTION

The present invention relates to a device for generating oil pressure for a self-propelled artillery piece or a similar unit. In the prior art an internal combustion engine and hydrostatic transmissions driven by the engine and have been provided for the driving wheels of artillery pieces. Such hydrostatic transmissions comprise a non-self-priming main pump with a feed pump and a motor driven by the main pump for each driving wheel.

The invention is intended particularly for use with a field artillery piece of the type disclosed in Swedish patent application 73.0060-9 corresponding to U.S. Pat. No. 3,910,157. The patented device comprises two driving wheels and two pivot wheels which can turn freely around their vertical axes. Each driving wheel is provided with its own hydrostatic transmission, which in the known manner comprises a main pump and a driving motor of the axial piston type. The main pump in the transmissions can be controlled with control devices included in a control circuit for regulating the pressure of the pump. Elevation of the barrel, training, loading and firing of the piece are carried out hydraulically in the patented field artillery piece.

For artillery pieces of this general type, it is frequently desired to have an integrated system for generating oil pressure for all functions of the gun.

SUMMARY OF THE INVENTION

In a device according to the invention, the main pump in one of the hydrostatic transmissions is arranged so that it can be switched between its drive motor and control devices for other functions of the gun, such as aiming, loading, firing, and so forth.

BRIEF DESCRIPTION OF THE DRAWINGS

An embodiment proposed at present of a device that has the characteristics significant for the invention will be described in the following, with reference to the accompanying drawings, in which

In FIG. 1, two reversible variable displacement piston pumps 1 and 2, are driven in a known way via a dividing gear box 3 from an internal combustion engine (not shown) connected to the shaft 4. Pumps 1 and 2 are connected to axial piston hydraulic motors 5 and 6, respectively. Motors 5 and 6 are intended to produce a torque corresponding to the pressure generated by the respective pumps 1 and 2. The main pumps 1 and 2 are of the non-self-priming type, and are therefore provided with integrated feed pumps 7 and 8, respectively, which via non-return valves 9 and 10, respectively, ensure that the suction pipe of each the main pump constantly has an overpressure determined by the relief valve 11. The hydraulic driving motors 5 and 6 are connected to the driving wheels of the artillery piece, not shown in FIG. 1, in a known way via coupling devices.

Figure 1:
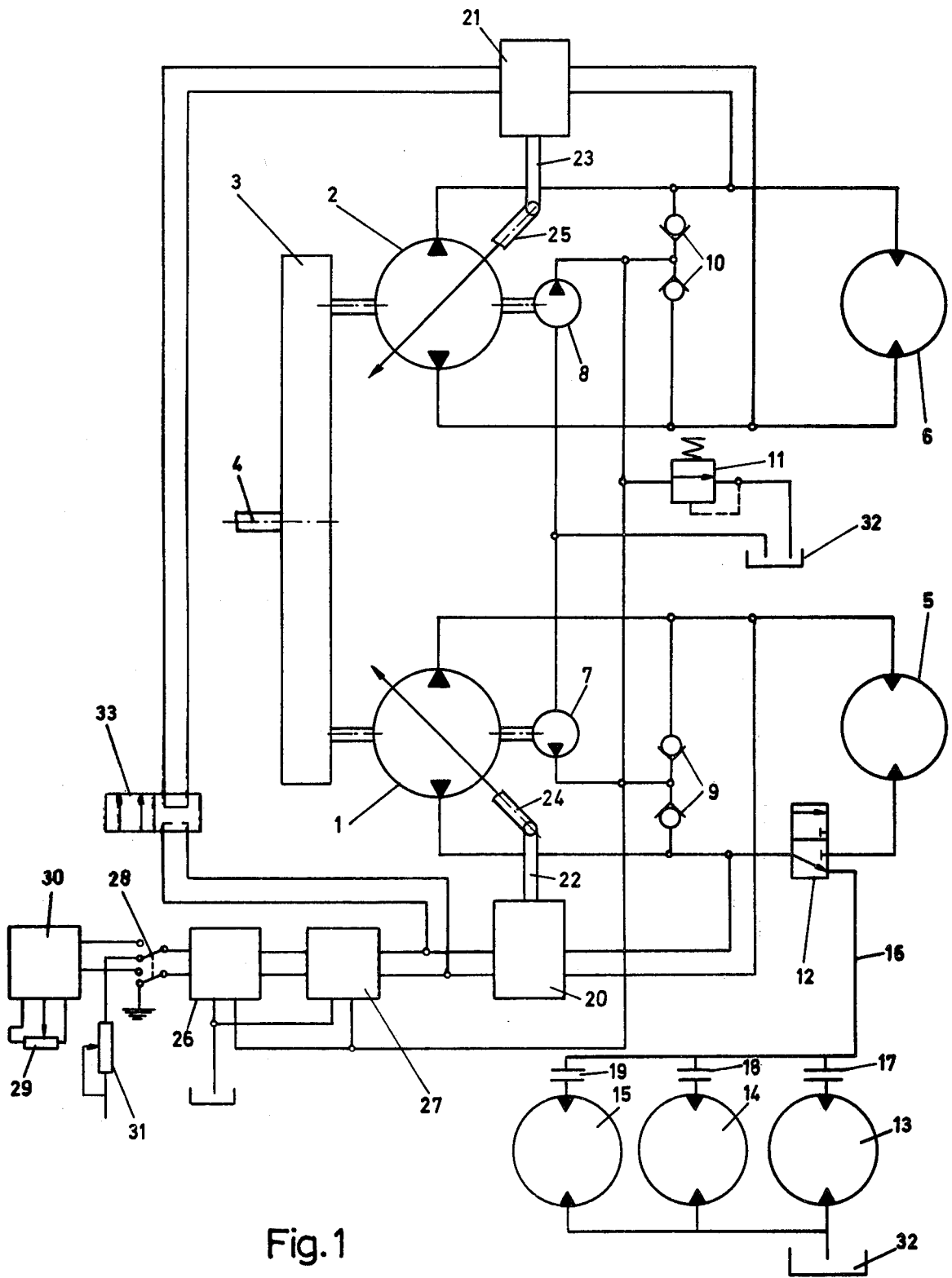
FIG. 1 shows a schematic diagram of the device.

Main pump 1 is arranged so that it can be switched by means of a valve 12 between its hydraulic motor 5 and other hydraulic control devices for the artillery pieces such as hydraulic driving motors 13, 14 and 15 for aiming, loading and firing, respectively. Connection to control devices 13, 14 and 15 takes place through a hydraulic pipe 16 via connection valves 17, 18 and 19, of known variety.

The feed pumps 7 and 8 are connected together in parallel so that they can supply sufficient feed capacity to the main pump 1 so that particularly when connected to the control devices for the firing function, pump 1 can produce sufficient discharge pressure and flow.

Main pumps 1 and 2 are controlled by means of a control circuit comprising hydraulic setting devices 20 and 21, respectively, having control pistons 22 and 23, respectively. The pilot levers 24 and 25 on the respective pumps are connected to pistons 22 and 23. The control circuit also includes an electrohydraulic converter 26 and a combined flow and pressure amplifier 27, of kinds which are known in themselves. The setting devices 20 and 21 are connected in parallel to the output of amplifier 27. The electrohydraulic converter 26 and the amplifier 27 are both sensitive to the pressure drop across feed pumps 7 and 8. The converter 26 and the amplifier 27 amplify feed pump pressure drop to a pressure drop suitable for the setting devices. The setting devices 20 and 21 which are also sensitive to the pressure drop across their corresponding main pumps, compare the main pump pressure drop with the pressure drop generated from the converter 26 and the amplifier 27. The load on the respective driving wheel thus determines a working pressure for its pump, which is sensed. In dependence on the sensed pressure, the working pressure is kept constant through throttling of the flow from the pump in question.

The input to the electrohydraulic converter is connected via an electric change-over switch 28 to either of two control devices 29 and 31. Control devices 29, in its switched-on positin, is connected to the converter 26 by an intermediate electronic circuit 30; while the other control device 31 is connected directly. The control device 29 is utilized when the piece is driven in coordination with a towing vehicle, in which case control device 29 is located on the towing vehicle, which is not shown. The purpose of the electric circuit 30 is, among other things, to automatically reduce a control voltage set on the control device 29 if the speed of the internal combustion engine, for a control magnitude which has been set, goes down below a certain value, for instance due to overloading. For this purpose, the electronic circuit is connected to a speed transmitter, not shown, in a way which is not indicated.

The control device 29, which in the case shown, has the form of a potentiometer, produces a current via the change-over switch 28 to the converter 26, which then produces a difference pressure or pressure drop which is proportional to the current. The difference pressure from the converter 26 is amplified by amplifier 27, to provide the target value for the system pressure desired from the respective main pump. Setting devices 21 and 22 compare the target value pressure drop, and the existing pressure drop from the respective main pump. Any difference drop is translated via a spring (not shown) to change the position of the pistons 23, 25 of the setting devices 21, 22. Movement of pistons 22, 23 changes the settings of servo valves 54, 55 (shown in FIG. 2). This in turn produces a pilot flow corresponding to the changed setting to the control pistons of the pump in question. Movement of the control pistons causes a deflection of the return lever of the pumps, so that a return of servo valves 54, 55 takes place, and the flow is throttled. In this way, the displacement of each respective pump will be varied in response to new positions of the setting devices 21 and 22. The pressure produced by the pumps returns the setting devices to the target value. The deflections of the setting device will thereby determine the flow from the main pumps so that a pressure drop is achieved corresponding to the setting of the control device 29. As long as the control device 29 is not reset, the hydraulic motors 5 and 6 will actuate the driving wheels with a constant torque, regardless of the speed of the driving wheels. In this case, the speed of the artillery piece is not permitted to increase beyond a certain limit, and the coupling devices between the driving motors 5 and 6 and the driving wheels are arranged so that free wheeling takes place when the maximum flow is emitted from the pumps.

The setting devices 21, 22 are built together with control devices that can be actuated manually, not shown in FIG. 1, by means of which the pump flow in the respective hydrostatic transmission can be controlled individually to a constant value.

A corresponding control of the pressure drop across the pump 1 is obtained by means of the control device 31 when the pump 1 is switched over with the aid of the valve 12 to the position for firing, which corresponds to the position shown in FIG. 1. In this case, the oil flow will go from the oil tank 32 via the feeding pumps 7 and 8 and the non-return valve 9 to the main pump 1, where the pressure is increased to a pressure suitable for the automatic loading and firing devices, which is thus regulated with the device 31, and is fed to this system via the change-over valve 12 and the pressure pipe 16. From said system, the flow returns to the tank 32. In this case, the connection of the amplifier 27 with the setting device for the pump 2 can be switched off by means of a valve 33. When the valve 33 is in the position shown in FIG. 1, the setting device 21 is shunted so that its pump 2 is deactuated and cannot generate any flow. The control of the valves 12 and 33 and possibly the electric change-over switch 28 should appropriately be co-ordinated so that when the pump 1 is connected to the driving members 13 - 15 the valve 33 will shunt the setting device 21 and the change-over switch 28 will connect the device 31.

Figure 2:
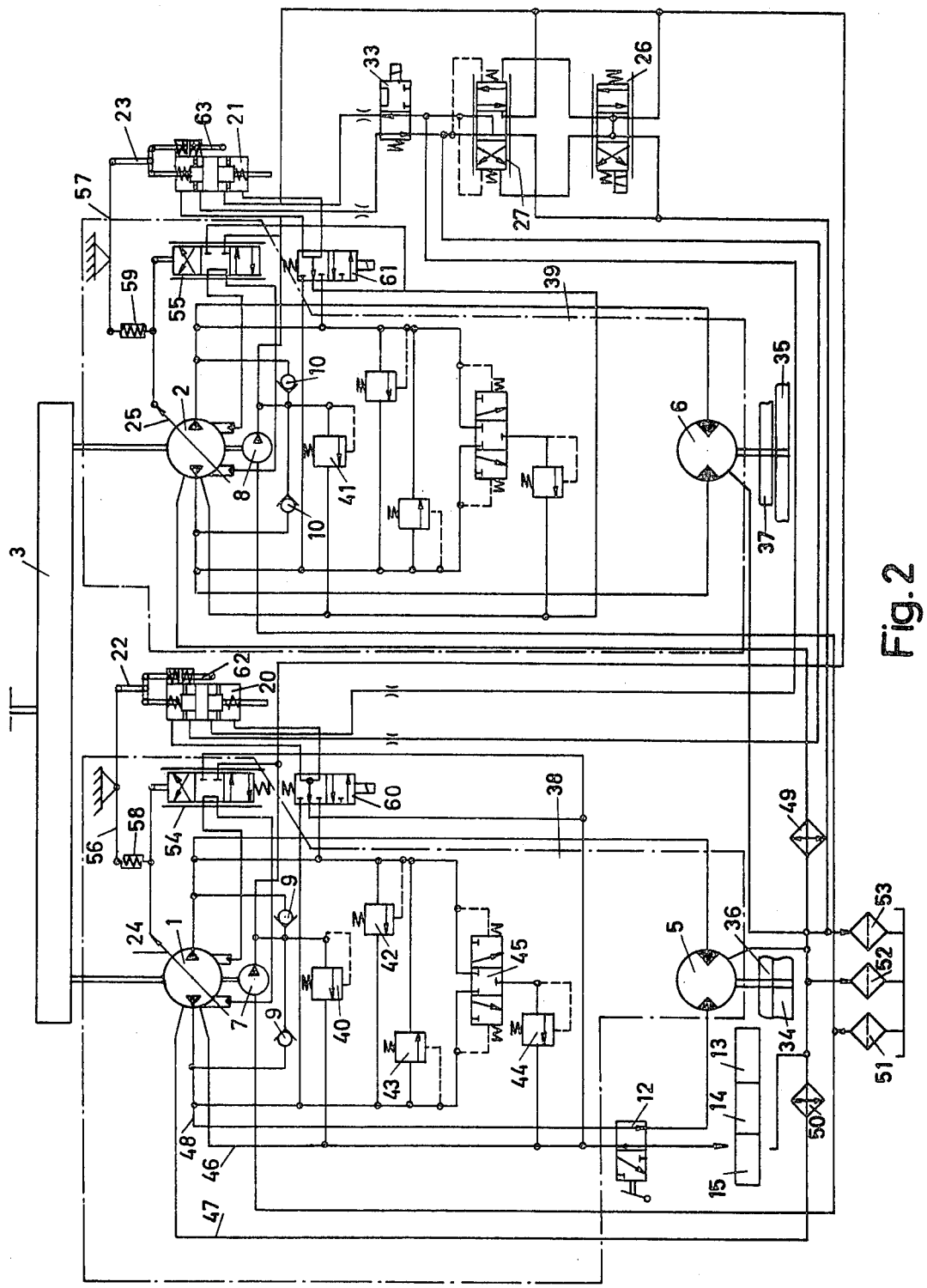
FIG. 2 shows a detailed diagram of portions of the device according to FIG. 1.

FIG. 2 is intended to show in more detail how the units comprised in FIG. 1 are built up, and parts corresponding to each other have then been given the same reference designations in the two figures. In FIG. 2, the driving wheels of the artillery piece are indicated at 34 and 35; and the connections between the driving wheels and the hydraulic motors 5 and 6, at 36 and 37.

The hydraulic unit, which is known in itself, which comprises the hydrostatic transmissions with pumps, motors, and valves, is shown framed within the dot-dash lines 38 and 39, each of which encloses substantially identically built-up equipment. In this case, the feeding pumps 7 and 8 each have their relief valve 40 and 41, respectively. The hydraulic system for the respective pump each comprises two relief valves 42 and 43, one for each pumping direction, and in addition to this a further relief valve 44 is arranged at a flushing valve 45 which connects the suction side of the pump to the valve 44 so that the system is constantly flushed with cooling oil. In addition to the working flow pipe 46 between the hydraulic pump and the hydraulic motor, there is a first drain pipe 47 and a second drain pipe 48. The system also comprises two coolers 49 and 50, for cooling of the return flow, and a suction filter 51 and two return filters 52 and 53. The return filters are connected in parallel in order that there shall be little reduction in pressure. The drain pipes from the motors go direct to the filters, and it is thus only the oil from the pumps that is cooled. The flushing oil from the flushing and relief valves is conveyed into the pump housing. The setting devices 20, 21, respectively, actuate the servo valves 54, 55 of the pump via pilot levers 56, 57, and springs, 58, 59 respectively. The return levers 24, 25 of the pumps are also connected with the servo valves, so that the levers can be actuated when a pilot flow initiated by the servo valve deflects the pump in question. In this case, the setting devices 20, 21 each have a control valve 60, 61, respectively.

The respective setting devices 20, 21 can be of kinds which are known in themselves, and made with zero position controls 62, 63 which makes it possible for the device to function in cooperation with control device 29, 30 used for self-propulsion of the gun. The respective setting devices 20, 21 comprises a piston which is of the double-action type, and the zero position controls 62, 63 are formed by means of springs set on either side of the piston and cup-formed inner pistons with protruding flanges which can coact with holding surfaces arranged in the inner wall of the setting device. The valves 60 and 61 are switched during self-propulsion, and direct control of the control circuits of the pumps can take place by means of the two separate zero position controls 62, 63.

The invention is not limited to the embodiment shown above as an example, but can be subject to modifications within the scope of the following claims.

I claim:

1. Apparatus for producing a flow of pressurized oil for selective operation of the weapon on a self-propelled artillery piece of the type having a plurality of driven wheels and at least one hydrostatic transmission for driving said wheels during self-propulsion, said at least one hydrostatic transmission comprising a variable displacement hydraulic pump and a hydraulic motor driven by flow from said pump, comprising:
   means for selectively diverting the output flow of the variable displacement pump included in said at least one hydrostatic transmission from its associated hydraulic motor, to provide a flow of pressurized oil for operating said weapon; and
   means responsive to said flow of pressurized oil for controlling loading, aiming, firing and related functions of said weapon.

2. Apparatus according to claim 1, wherein each of said plurality of driven wheels has its own hydrostatic transmission; and wherein said diverting means diverts the flow from only a portion of the corresponding plurality of variable displacement pumps, further comprising means for deactuating the remainder of said plurality of variable displacement pumps when said diverting means is actuated.

3. Apparatus according to claim 2, wherein each of said plurality of hydrostatic transmissions comprises a feed pump for its associated variable displacement hydraulic pump, the discharge of said feed pump of each of said plurality of hydrostatic transmissions also being connected in parallel to the suction ports of said portion of said variable displacement hydraulic pumps, whereby said portion of said variable displacement pumps receives increased feed flow when said diverting means is actuated.

4. Apparatus according to claim 3, wherein the discharge pressure of said feed pumps also is directed to an electrohydraulic convertor means for producing a first pressure drop signal in response to both said discharge pressure and an electrical control signal; said first pressure drop signal being directed to a flow and pressure amplifier means for producing a second pressure drop signal in response to both said discharge pressure and said first pressure drop signal; and means responsive to said second pressure drop signal for adjusting the pressure drop across said portion of said variable displacement pumps.

5. Apparatus according to claim 4, further comprising means for manually controlling said pressure drop across said portion of said variable displacement pumps.

6. Apparatus according to claim 4, further comprising means for producing said electrical control signal to regulate the speed of said self-propelled artillery piece, when none of said output flow has been diverted by said diverting means; and means for producing said control signal to regulate the flow of pressurized oil to said means for controlling loading, aiming, firing and related functions of said weapon, when said output flow has been diverted.

7. Apparatus according to claim 6, further comprising means for manually controlling said pressure drop across said portion of said variable displacement pumps.

* * * * *